United States Patent
Juarez et al.

(10) Patent No.: US 9,527,545 B2
(45) Date of Patent: Dec. 27, 2016

(54) BICYCLE SUSPENSION SYSTEM

(71) Applicant: Cycling Sports Group, Inc., Norwalk, CT (US)

(72) Inventors: Jeffrey Daniel Juarez, Freiburg (DE); Wolfgang Ebersbach, Gudelfingen (DE); Sante Pelot, Freiburg (DE)

(73) Assignee: CYCLING SPORTS GROUP, INC., Norwalk, CT (US)

( * ) Notice: Subject to any disclaimer, the term of this patent is extended or adjusted under 35 U.S.C. 154(b) by 0 days.

(21) Appl. No.: 14/825,490

(22) Filed: Aug. 13, 2015

(65) Prior Publication Data
US 2016/0046346 A1 Feb. 18, 2016

Related U.S. Application Data

(60) Provisional application No. 62/037,663, filed on Aug. 15, 2014.

(51) Int. Cl.
| | |
|---|---|
| *B62K 19/18* | (2006.01) |
| *B62K 25/28* | (2006.01) |
| *B62K 25/30* | (2006.01) |
| *F16F 9/32* | (2006.01) |
| *F16F 9/06* | (2006.01) |

(52) U.S. Cl.
CPC ............ *B62K 19/18* (2013.01); *B62K 25/286* (2013.01); *B62K 25/30* (2013.01); *F16F 9/064* (2013.01); *F16F 9/3292* (2013.01); *B62K 2201/08* (2013.01)

(58) Field of Classification Search
CPC .............................................. B62K 2025/047
See application file for complete search history.

(56) References Cited

U.S. PATENT DOCUMENTS

| | | | | |
|---|---|---|---|---|
| 644,957 A | * | 3/1900 | Williams | B62K 25/286 280/284 |
| 1,068,583 A | * | 7/1913 | Harley | B62K 25/286 280/284 |
| 1,071,892 A | * | 9/1913 | Diepenhorst et al. | B62K 25/286 280/284 |
| 3,861,740 A | * | 1/1975 | Tajima | B62K 19/36 248/157 |
| 3,877,539 A | | 4/1975 | Tilkens | |
| 4,679,811 A | | 7/1987 | Shuler | |
| 5,409,248 A | * | 4/1995 | Williams | B62K 25/30 188/285 |

(Continued)

FOREIGN PATENT DOCUMENTS

| | | |
|---|---|---|
| DE | 20005224 U1 | 7/2001 |
| EP | 1060979 A2 | 12/2000 |
| JP | DE 202010012738 U1 * 11/2010 | ............... B62J 1/06 |

OTHER PUBLICATIONS

European Partial Search Report for Application No. EP15181158 issued Dec. 23, 2015; 7 pgs.

*Primary Examiner* — Kevin Hurley
(74) *Attorney, Agent, or Firm* — Cantor Colburn LLP

(57) ABSTRACT

A bicycle includes a frame having a plurality of frame members that includes a first frame member, and a suspension system. The suspension system includes a first portion and a second portion fluidly coupled via hydraulic fluid to the first portion. The first portion is disposed external of the first frame member, and the second portion is disposed internal to the first frame member.

17 Claims, 15 Drawing Sheets

(56) References Cited

U.S. PATENT DOCUMENTS

| | | | | |
|---|---|---|---|---|
| 5,509,674 | A | * | 4/1996 | Browning .............. B62K 21/20 267/201 |
| 5,772,228 | A | * | 6/1998 | Owyang ................ B62K 25/30 280/284 |
| 6,688,626 | B2 | * | 2/2004 | Felsl ...................... B62K 25/04 267/124 |
| 8,256,787 | B2 | * | 9/2012 | Inoue ..................... B62K 25/08 280/275 |
| 2009/0302558 | A1 | * | 12/2009 | Shirai .................... B62K 25/08 280/5.515 |

\* cited by examiner

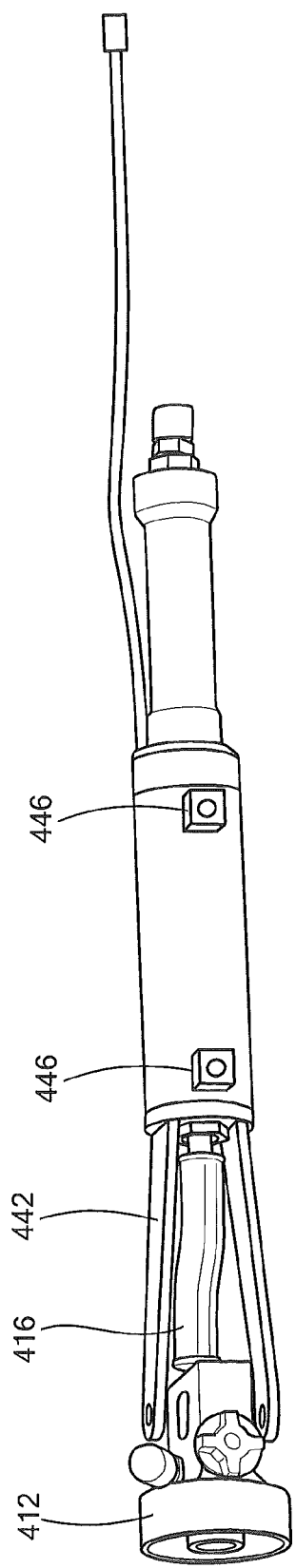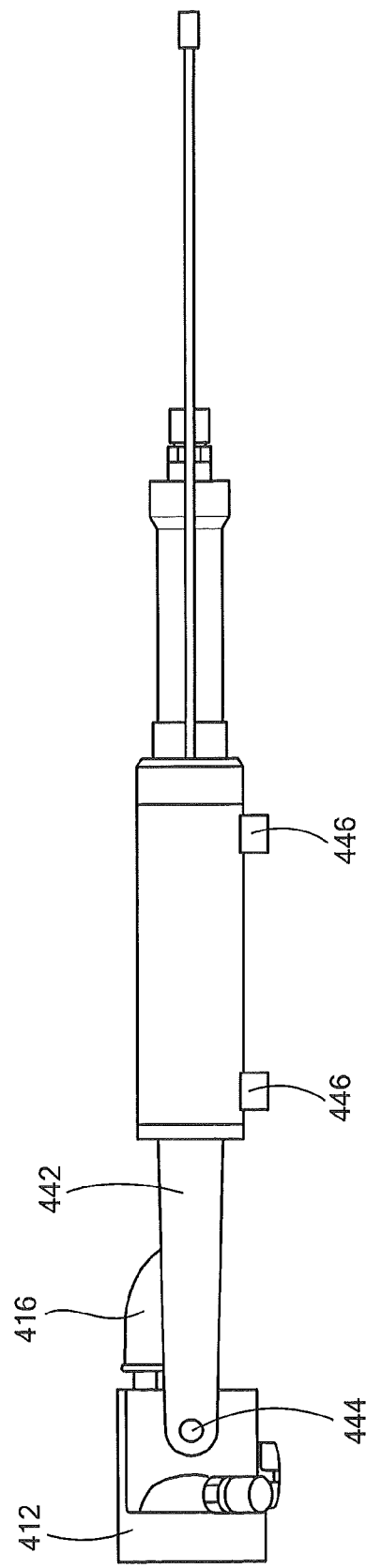

BICYCLE SUSPENSION SYSTEM

CROSS REFERENCE TO RELATED APPLICATIONS

This application claims the benefit of U.S. Provisional Application Ser. No. 62/037,663, filed Aug. 15, 2014, which is incorporated herein by reference in its entirety.

BACKGROUND OF THE INVENTION

The present disclosure relates generally to a bicycle suspension system, particularly to a bicycle suspension system having a split shock assembly, and more particularly to a bicycle suspension system having a split rear shock assembly.

A known bicycle suspension system is disclosed, for example, in U.S. Pat. No. 8,459,418.

While existing suspension systems for a bicycle may be suitable for their intended purpose, the art of bicycle suspensions systems, however, would be advanced by a split shock format as herein disclosed.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

In an embodiment of the invention, a bicycle includes a frame having a plurality of frame members that includes a first frame member, and a suspension system. The suspension system includes a first portion and a second portion fluidly coupled via hydraulic fluid to the first portion. The first portion is disposed external of the first frame member, and the second portion is disposed internal to the first frame member. In a further embodiment of the invention, the first portion of the suspension system includes a shock absorber, and the second portion of the suspension system includes a lock-out valve and a fluid reservoir.

The above features and advantages and other features and advantages of the invention are readily apparent from the following detailed description of the invention when taken in connection with the accompanying drawings.

BRIEF DESCRIPTION OF THE DRAWINGS

Referring to the non-limiting drawings wherein like elements are numbered alike in the accompanying Figures:

FIGS. 7A and 7B depict the second inner portion of the split rear shock of FIG. 4 in accordance with an embodiment of the invention;

DETAILED DESCRIPTION OF THE INVENTION

Figure 1:
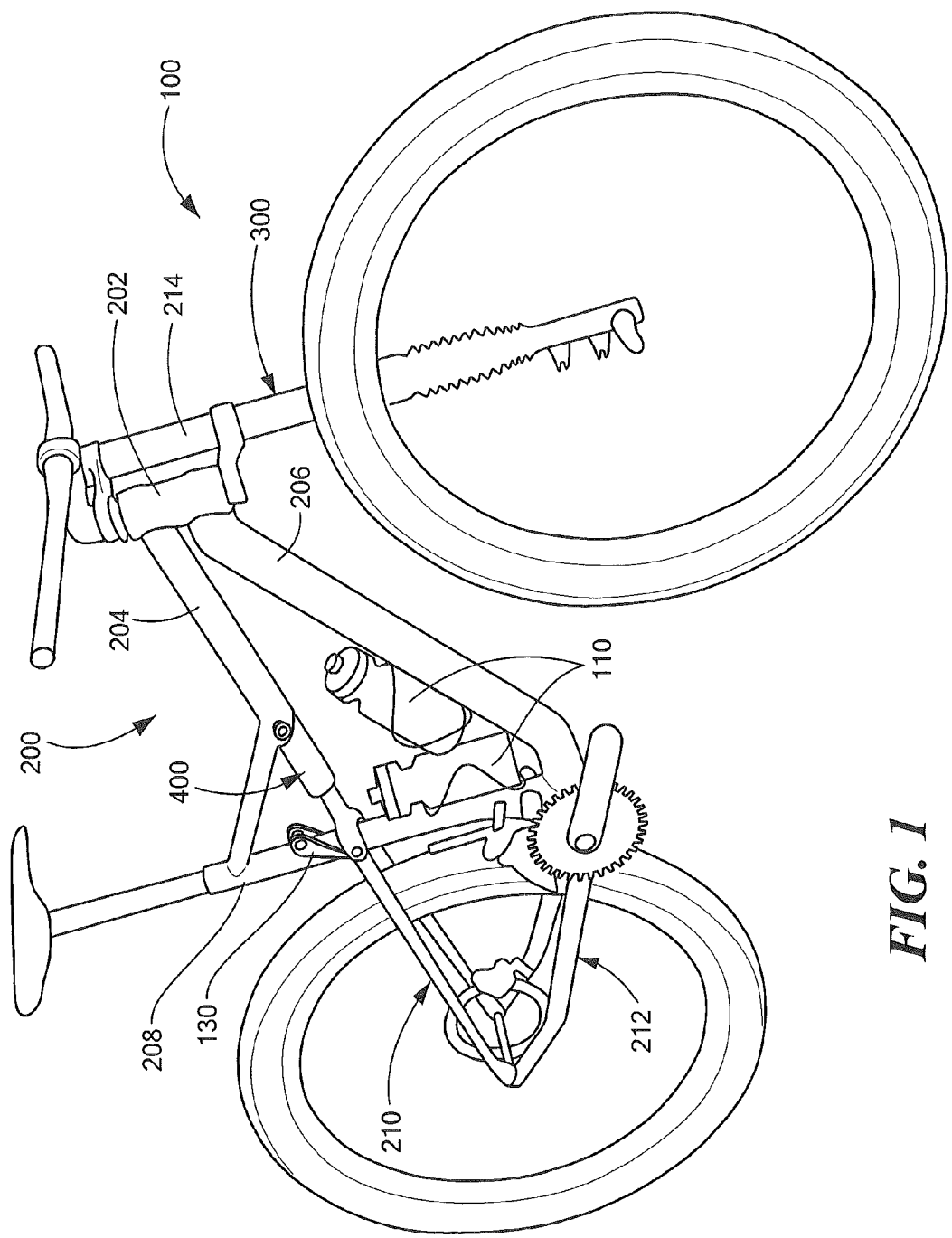
FIG. 1 depicts an embodiment of a bicycle in accordance with an embodiment of the invention.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In an embodiment, a shock absorbing system for a bicycle includes: a shock absorber unit external of a tubular frame of the bicycle; and, a valve assembly (valve/reservoir unit) disposed internal of the tubular frame of the bicycle; where the shock absorber unit and the valve/reservoir unit are in fluid communication with each via a flexible hose or any other confined fluid path suitable for a purpose disclosed herein. Separation of the externally mounted shock absorber unit and the internally mounted valve/reservoir unit is herein referred to as a split shock format. Actuation of the shock absorber, resulting from the bicycle experiencing shock absorbing terrain, causes movement of a piston in the shock absorber unit, which causes internal fluid flow between the shock absorber unit and the valve/reservoir unit. A compressible air chamber within the valve/reservoir unit accommodates ebb and flow of shock absorbing fluid. The placement of the valve/reservoir unit internal of the tubular frame of the bicycle provides shock absorbing functionality in a sleek aerodynamic bicycle frame. Another advantage of the split shock format is to maximize space between the frame members for water bottles or other accessories, which creates a visually uncluttered look for the bicycle. The valve/reservoir unit includes an electro mechanical actuator (EMA), which may be a rotational electro mechanical actuator (REMA), a lock-out valve, which may be a rotary actuated lock-out valve, in operable communication with the EMA/REMA, and a blow-off valve, which will be described in more detail below. For ease of discussion, reference is made herein to a REMA (also herein referred to as an actuator) and a rotary actuated lock-out valve that is actuated by the REMA, but it will be appreciated that an EMA may be substituted for a REMA, and a non-rotary lock-out valve may be substituted for a rotary lock-out valve, without detracting from a scope of the invention disclosed herein.

While embodiments described herein depict a valve/reservoir unit that is driven by a REMA driven by electrical power, it will be appreciated that the split shock format may also be implemented using a mechanically actuated lock-out valve as opposed to the REMA actuated lock-out valve discussed above and in more detail herein below. Such an arrangement is considered to fall within the scope of the invention disclosed herein.

While embodiments described herein depict bicycles suitable for mountain bike type applications, it will be appreciated that the disclosed invention is also applicable to other bicycle frame types, such as but not limited to commuter style bicycles or BMX style bicycles, for example, and is also applicable to motorized or partially motorized wheeled vehicles, such as electric bikes, motorcycles (two or three wheels), motor scooters, mopeds, or all-terrain vehicles (three, four or more wheels), for example. As such, the scope of the invention is not limited to only the bicycle frame embodiments disclosed herein, but encompasses all bicycle frame types and vehicle types that fall within the ambit of the invention disclosed herein.

FIG. 1 depicts an embodiment of a bicycle 100, such as a mountain bike for example, having a frame 200 that includes a front suspension system 300 and a rear suspension system 400. The rear suspension system 400 has a split shock format, also herein referred to as a split rear shock 410 (see FIG. 2 for example), in accordance with an embodiment of the invention, which is described in detail herein. From the teachings herein, however, it will also be appreciated that the split shock format can also be implemented on the front suspension system 300. In general, the frame members 200 include a head tube 202, a top tube 204, a down tube 206, a seat tube 208, seat stay tubes 210, and chain stay tubes 212, but it will be appreciated that other frame member configurations may be employed that could benefit from an embodiment of the invention disclosed herein. In the illustrated embodiment of FIG. 1, and pivotally coupled to the head tube 202, is a lefty front tube 214. Alternatively, front fork tubes may be used in place of the lefty front tube 214.

Figure 2:
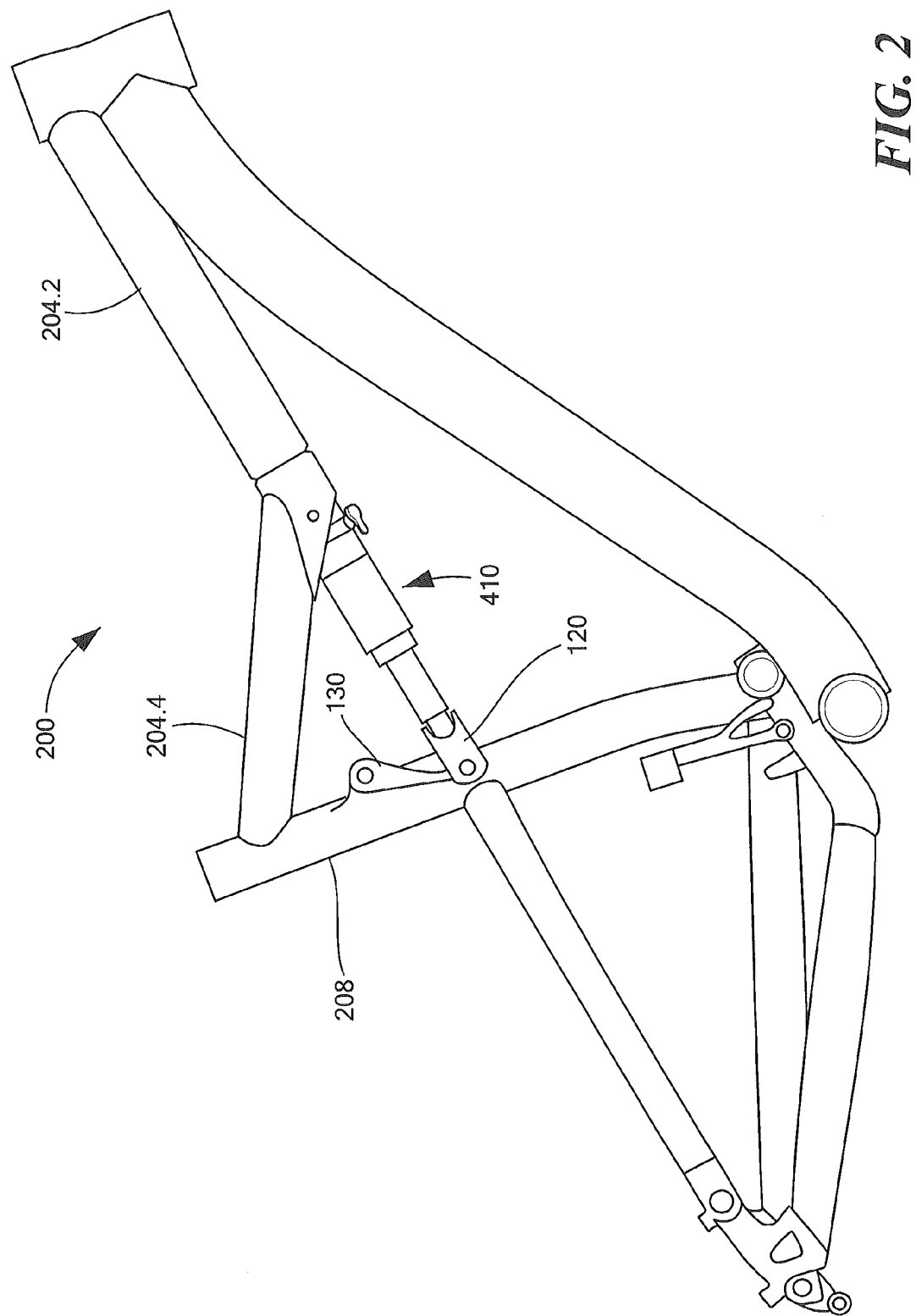
FIG. 2 depicts a bicycle frame for the bicycle of FIG. 1 in accordance with an embodiment of the invention.

FIG. 2 depicts a bicycle frame 200 similar to that depicted in FIG. 1 having a split rear shock 410, where the top tube 204 has a front top tube 204.2 and a rear top tube 204.4.

Figure 3:
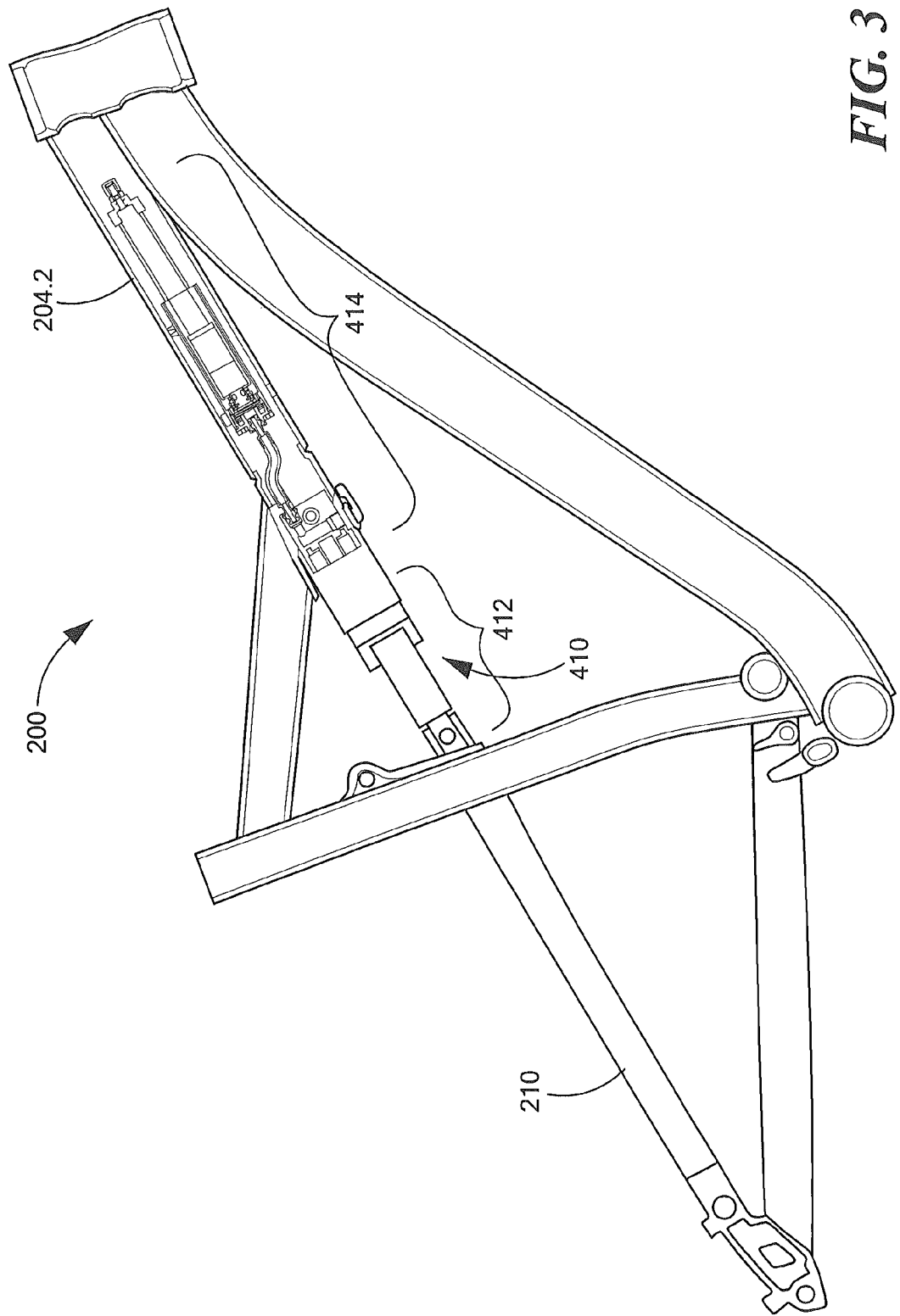
FIG. 3 depicts the bicycle frame of FIG. 2 with a portion of the front top tube cut away to illustrate placement of portions of the split rear shock within the top tube in accordance with an embodiment of the invention.

FIG. 3 depicts the bicycle frame 200 of FIG. 2 with a portion of the front top tube 204.2 cut away to illustrate placement of portions of the split rear shock 410 within the top tube 204 in accordance with an embodiment of the invention, and as described in detail herein. In an embodiment, the split rear shock 410 has a first portion 412 disposed external of the top tube 204, and a second portion 414 disposed internal to the top tube 204, and more specifically in an embodiment disposed internal of the front top tube 204.2. As depicted in FIG. 3, the second portion 414 of the split rear shock 410 is fully integrated into the front top tube 204.2 of the frame 200, and disposed in line with the first portion 412 of the split rear shock 410 to provide an uncluttered aesthetic. Further as depicted in FIGS. 1-3, the split rear shock 410 is disposed in line with the seat stay tubes 210, with the first portion 412 being coupled to the seat stay tubes 210 via a coupling 120, which in turn is coupled to the seat tube 208 via a pivotable swing arm 130.

Figure 4:
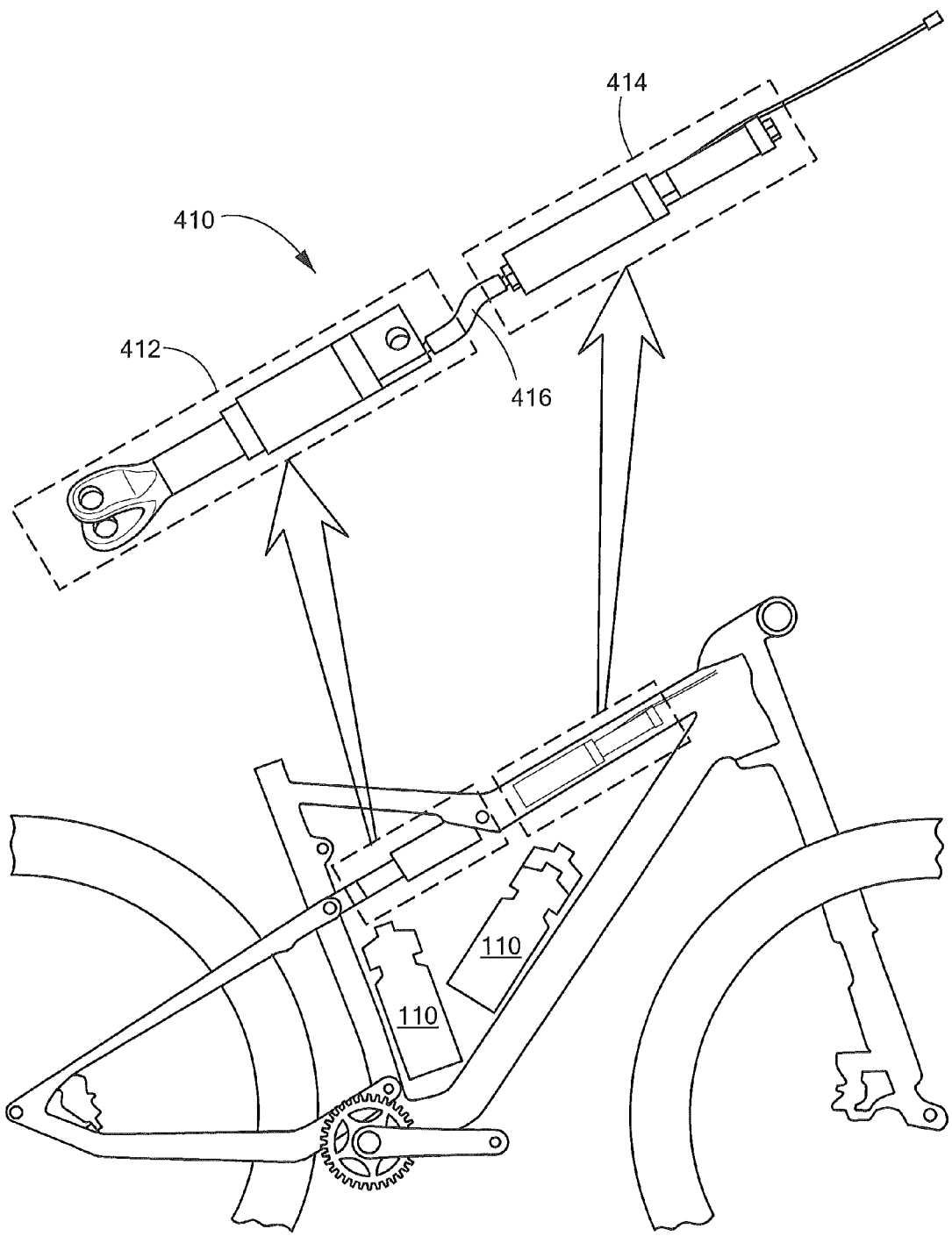
FIG. 4 depicts first and second portions of the split rear shock coupled in fluid communication with each other via a flexible hose in accordance with an embodiment of the invention.
Figure 5:
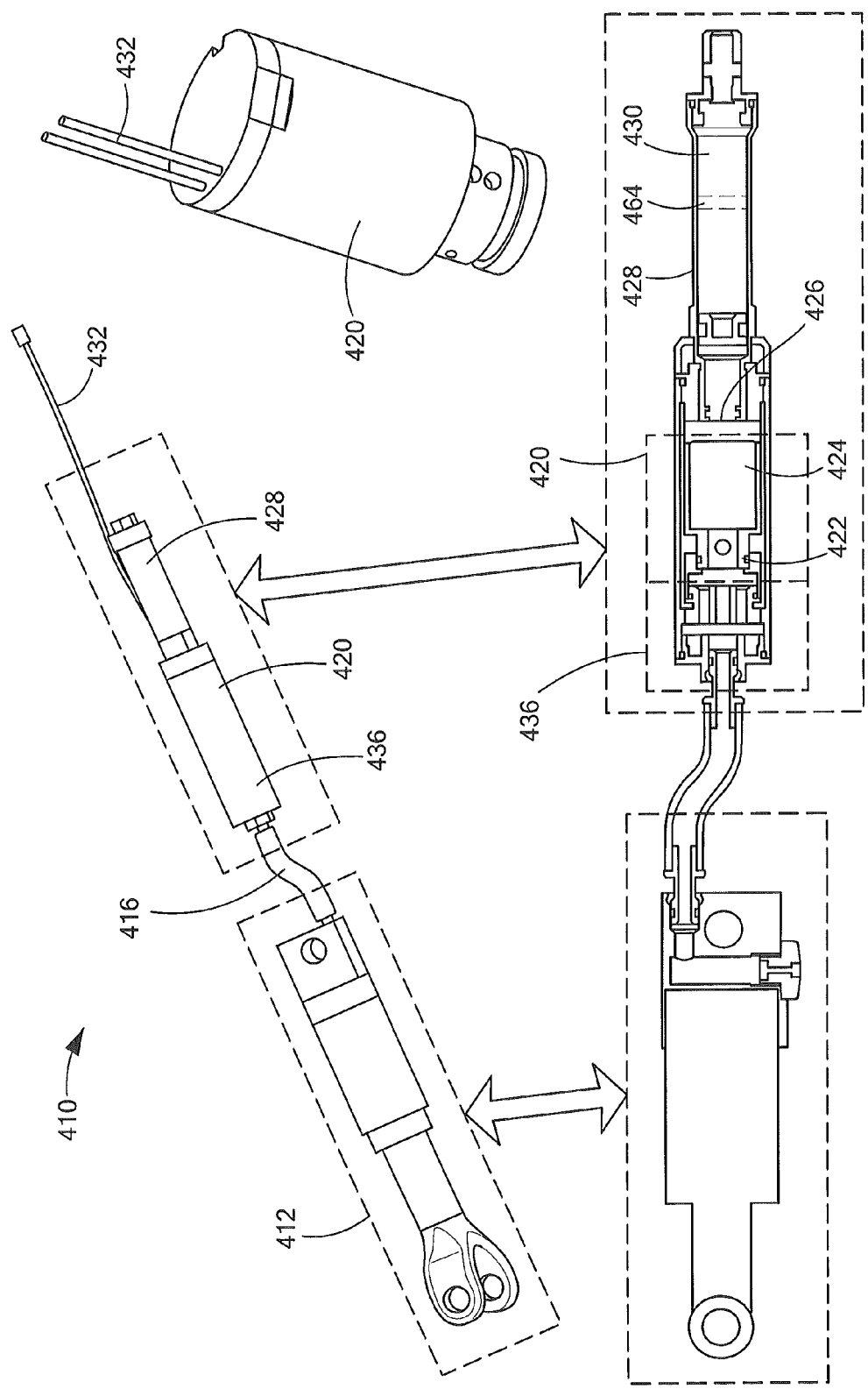
FIG. 5 depicts the split rear shock of FIG. 4 in more detail in accordance with an embodiment of the invention.

FIG. 4 depicts first 412 and second 414 portions of the split rear shock 410 coupled in fluid communication with each other via a flexible hose 416. While the term flexible hose is used herein, it will be appreciated that a rigid or semi-rigid fluid coupling may also be employed without detracting from the scope of the invention. A key distinction here over other bicycle shock absorber art is that the split rear shock format employs a first outer portion 412 that includes a shock absorber (an air spring, a rebound damping circuit, a compression damping circuit, or any combination thereof) (See FIGS. 5 and 6 for example), and a second inner portion 414 that includes a valve assembly (valve/reservoir unit) having a lock-out valve and a blow-off valve, and optionally including a compression damping circuit (see FIGS. 5 and 6 for example), where the first and second portions 412, 414 are coupled in fluid communication with each other via the flexible hose 416. In embodiments depicted herein, the first outer portion 412 is disposed outside of the top tube 204, and the second inner portion 414 is disposed within the top tube 204 (more specifically in an embodiment within the front top tube 204.2) of the bicycle frame 200. As depicted in FIGS. 1 and 4, the split shock format maximizes the space between the frame members, such as the top tube 204, the down tube 206 and the seat tube 208, for at least two water bottles or other accessories, generally herein referred to by reference numeral 110, which creates a visually uncluttered look for the bicycle 100.

FIGS. 5 and 6A-E depict the split rear shock 410 of FIG. 4 in more detail. In an embodiment, a valve assembly 420 includes a rotary lock-out valve 422, a bi-stable REMA 424, a blow-off valve 426, and a reservoir 428. A compressible air chamber 430 within the valve/reservoir unit 420 accommodates ebb and flow of shock absorbing fluid. In an embodiment, and best seen with reference to FIG. 6D, the compressible air chamber 430 is a bladder that surrounds the valve assembly 420 internal of the valve housing. In another embodiment (see FIG. 5 for example), the compressible air chamber is disposed in the housing of the reservoir 428 and has a piston 464 that separates the hydraulic chamber (left side of piston 464) from the air chamber (right side of piston 464) in a manner known in the art. Electrical wires 432 connect to the REMA 424, sensors, such as an accelerometer, and a power supply, disposed on or within the frame 200, for actuation thereof (discussed further below with reference to FIG. 8 for example).

Figure 6A:
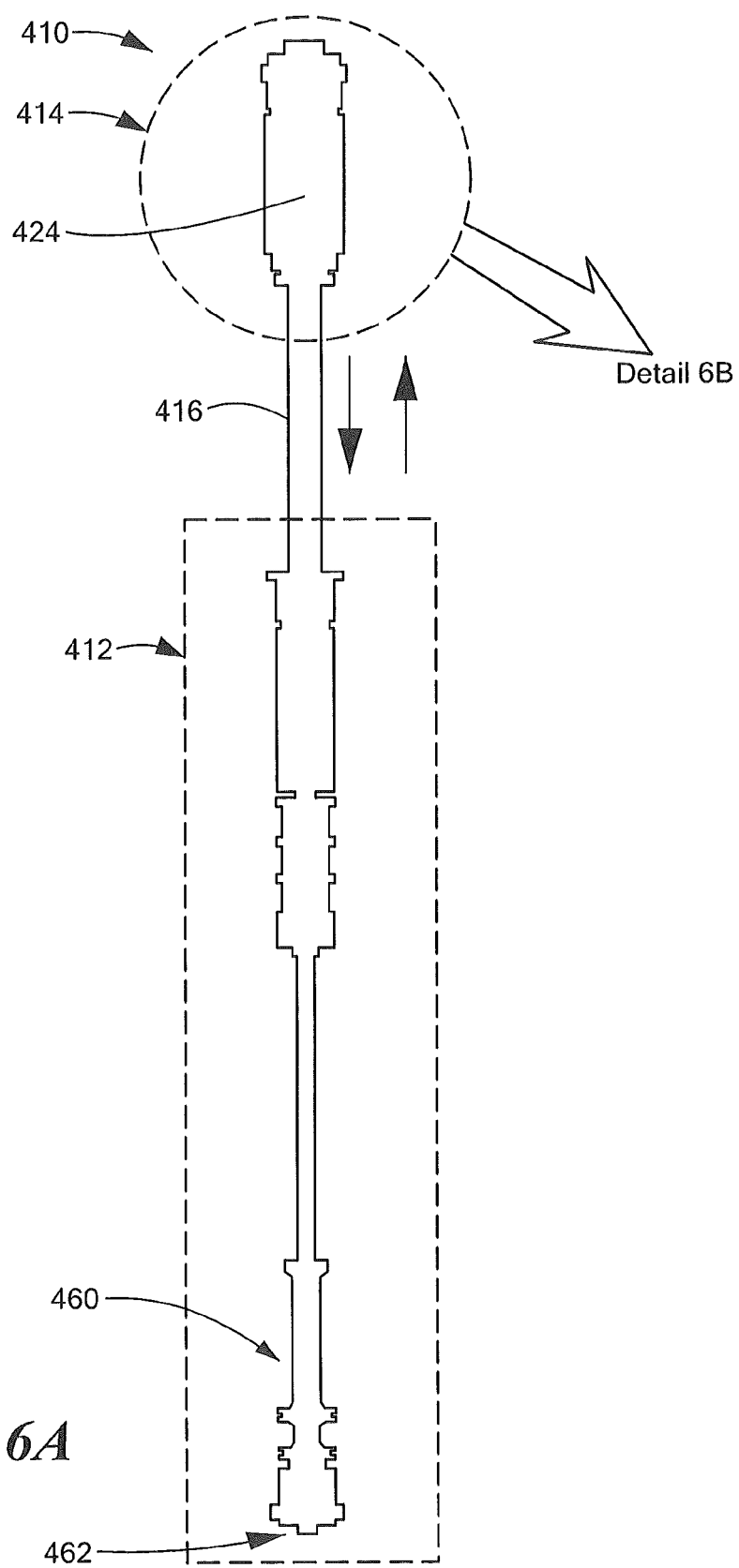
FIGS. 6A-6E depict the split rear shock of FIG. 4 in more detail in accordance with an embodiment of the invention.
Figure 6B:
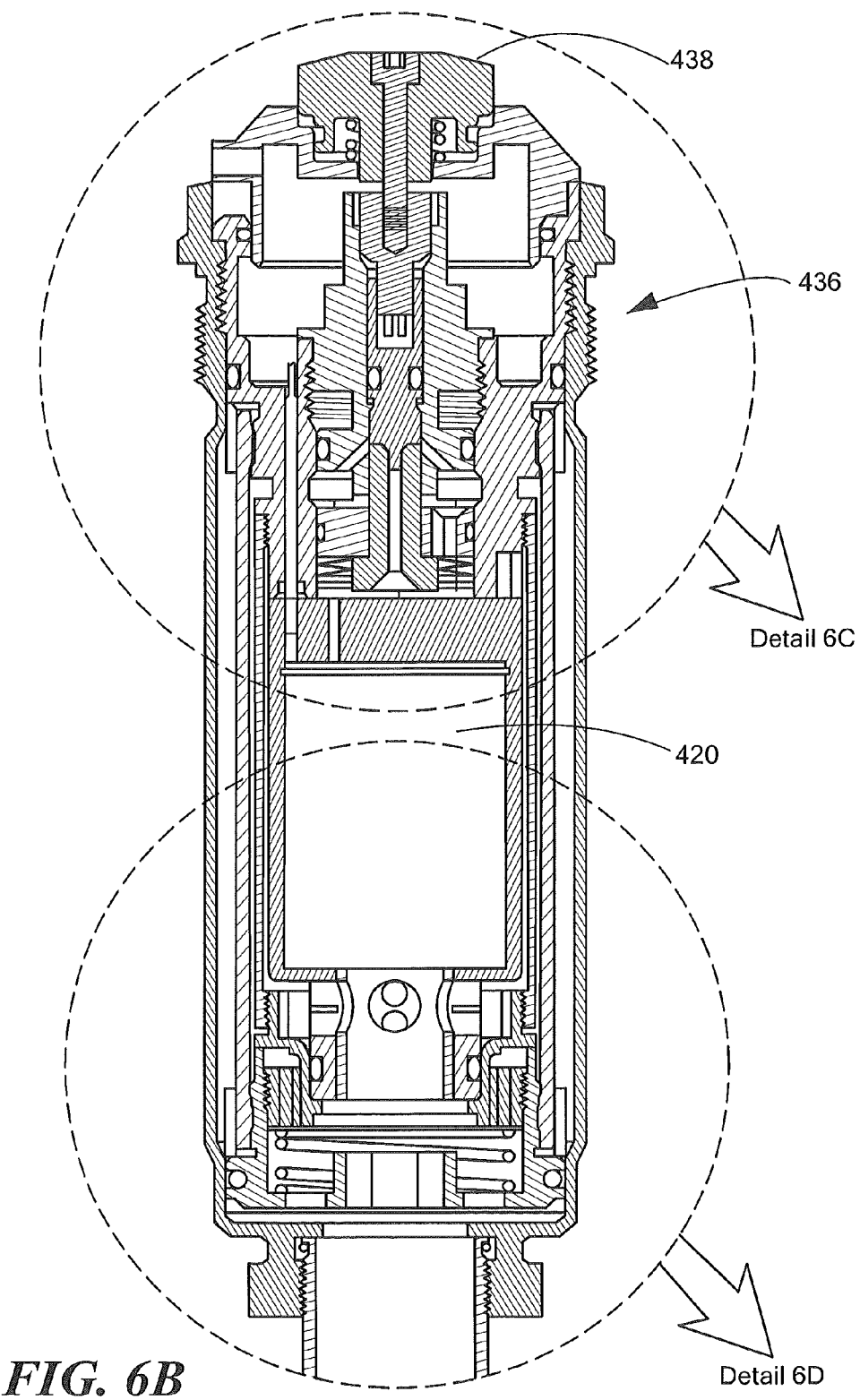
Figure 6C:
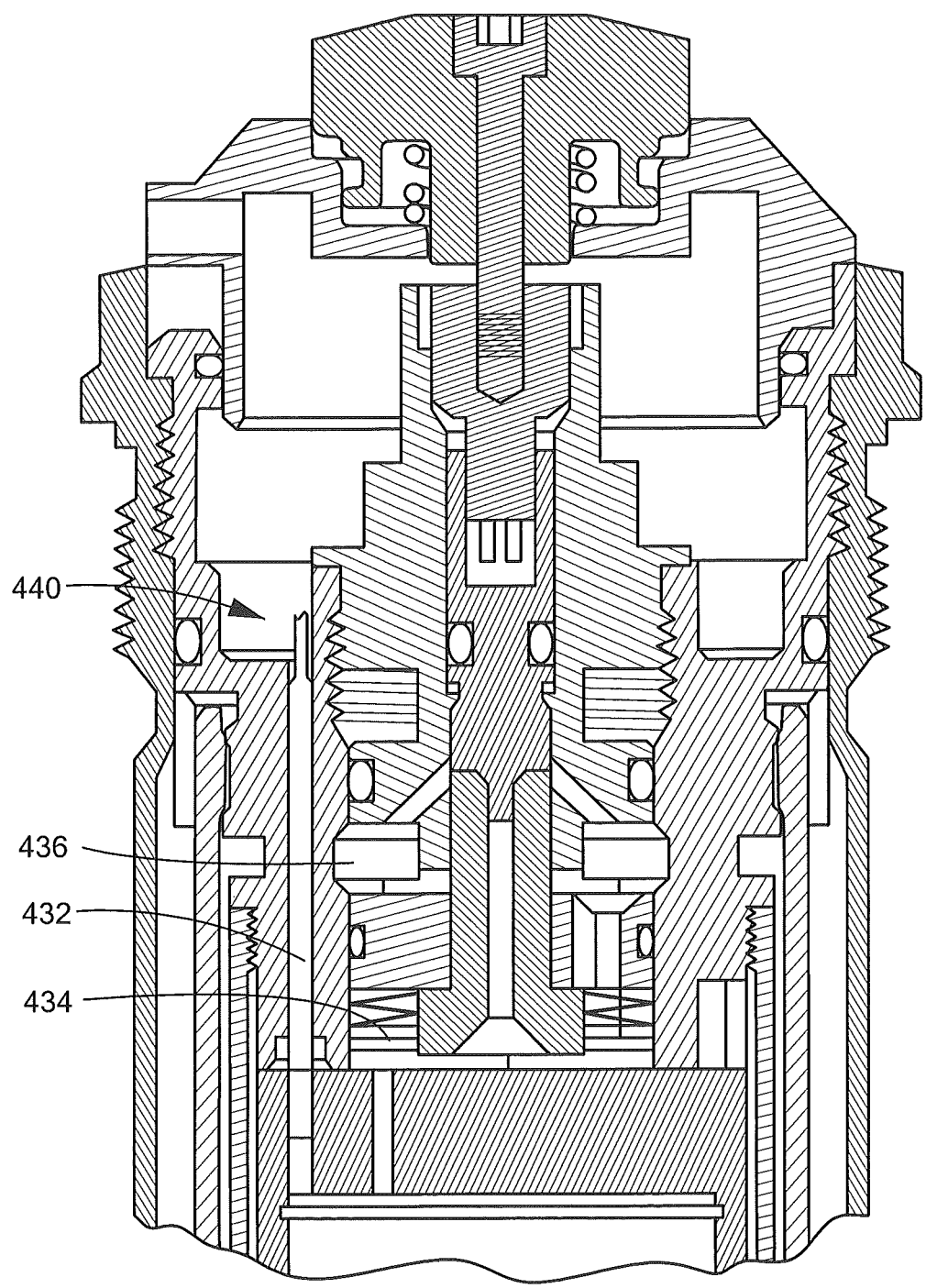
Figure 6D:
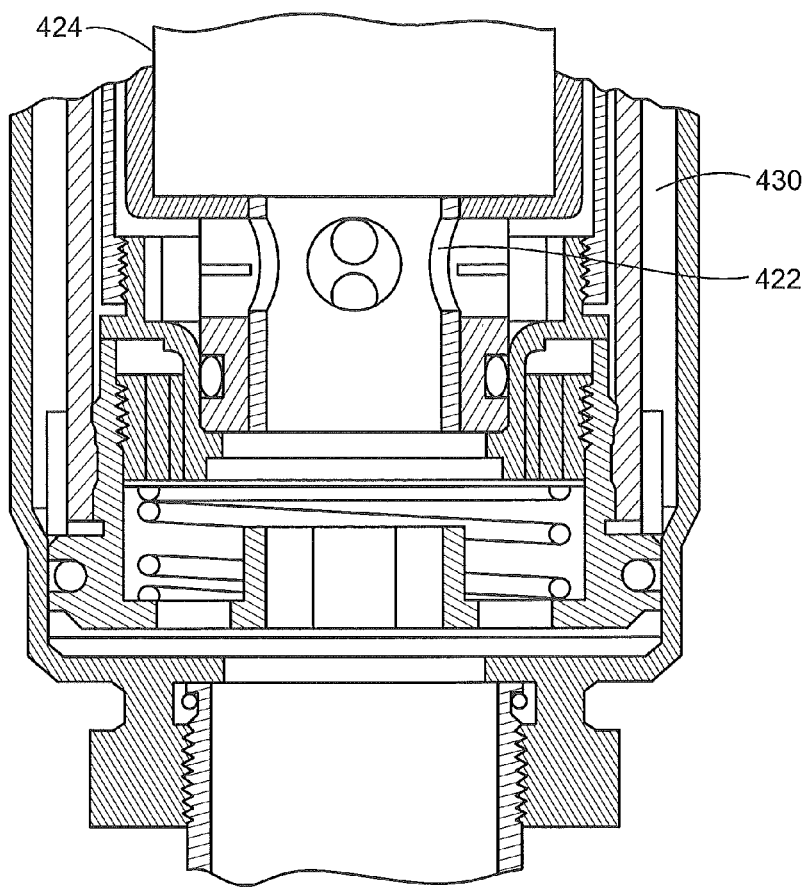
Figure 6E:
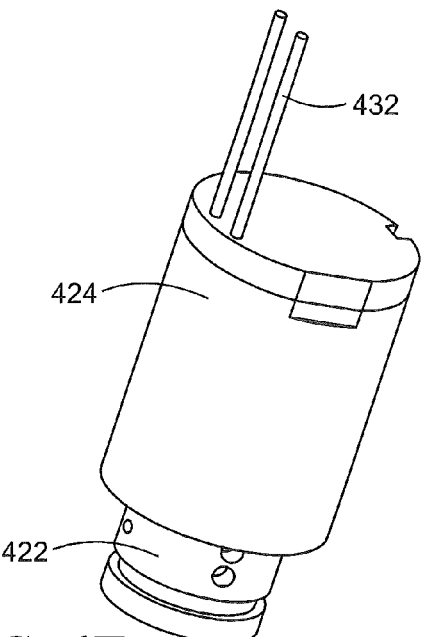

With reference now to FIG. 6A-6E, an embodiment of the split shock 410 is depicted with various details illustrated in expanded view, such as Detail 6B illustrated in the expanded view of FIG. 6B, Detail 6C illustrated in the expanded view of FIG. 6C, and Detail 6D illustrated in the expanded view of FIG. 6D. In general: FIG. 6A depicts a split shock 410 similar to that of FIGS. 2-5 with a first outer portion 412 (also herein referred to as a hydraulic damping unit, shock absorber, or shock), a second inner portion 414 (also herein referred to as a valve/reservoir unit, or a compression/valve unit), and a flexible hose 416 that allows hydraulic fluid to transfer between the shock 412 and the compression/valve unit 414; FIG. 6B depicts an expanded view of an embodiment of the compression/valve unit 414; FIG. 6C depicts a further expanded view of an embodiment of a compression damping valve 436; FIG. 6D depicts a further expanded view of the lock-out valve 422 connected to and actuatable by the REMA 424; and, FIG. 6E depicts an expanded view of the valve 420 illustrating the REMA 424 and the lock-out valve 422 as a unit. An embodiment uses the bi-stable REMA 424 immersed inside the oil of the hydraulic damper unit 410 to either allow flow or prohibit flow, hence the term bi-stable, by actuating the lock-out valve 422. The response time of the actuator 424 is such that the valve 420, or more specifically the lock-out valve 422, opens and allows flow of hydraulic fluid before a rider of the bicycle 100 can perceive that a bump was encountered, where the bump is sensed via an accelerometer disposed on or within the frame 200 for example. The valve 420 could have other damping features integrated within the housing. For example, it could contain a pressure-relief 434 (or lock-out blow-off valve, as it is commonly referred to regarding a mountain bike suspension), a reflow check valve, and even the lock-out valve itself 422. In this way, parts could be reduced, reducing cost and weight for the assembly. The valve 420 could be used in either the rear suspension system 400 of a bicycle 100 or the front suspension system 300. In an embodiment, the lock-out valve 422 is arranged such that oil flows first through the lock-out valve 422, then through the compression damping valve 436 during a compression stroke. This arrangement allows compression damping adjusters 438 (commonly known as low-speed compression adjusters, high-speed compression adjusters, and lock-out threshold adjusters) to be easily employed such that they do not have to pass through or around the valve 420, which greatly reduces complexity. The compression damping valve 436 is made small enough so that the power supply wires 432 to the REMA 424 may pass around the outside of the compression damping valve 436 and other internal components 440. This prevents the compression damping valve 436 from having to be rotationally aligned (or "clocked") to the REMA 424 to allow the wires 432 to pass through the compression damping valve 436, and it also negates the need to seal the wires 432 that would otherwise need to pass through the compression damping valve 436. In an embodiment, the shock 412 incorporates an air spring (+ve/−ve chambers) and a rebound damping circuit, referred to generally by reference number 460, and a rebound damping and air pressure adjustment 462.

FIGS. 7A and 7B depict primarily the second inner portion 414 of the split rear shock 410. Straps 442 connect the valve/reservoir unit 420, 428 of the second portion 414 to the first outer portion 412 of the split rear shock 410 (illustrated in FIGS. 7A and 7B as only the end of the shock 410) by at least one structural support such as a bolt 444 that prevents axial movement (compression/tension) of the flexible hose 416. Bosses 446 on the valve/reservoir unit 420, 428 extend below and allow the valve/reservoir unit 420, 428 to be bolted to the inside of the top tube 204. In an embodiment where the top tube 204 is fabricated from aluminum, the valve/reservoir unit 420, 428 may be bolted to the top tube 204 in such a manner as to thermally connect the two structures together thereby enabling the aluminum top tube 204 to be used as a heat sink to cool the shock absorber 410. It is contemplated that cooling of the shock absorber 410 can be improved by as much as 500% over an arrangement where the top tube 204 is not aluminum and/or the valve/reservoir unit 420, 428 is not bolted to the top tube 204.

Figure 8:
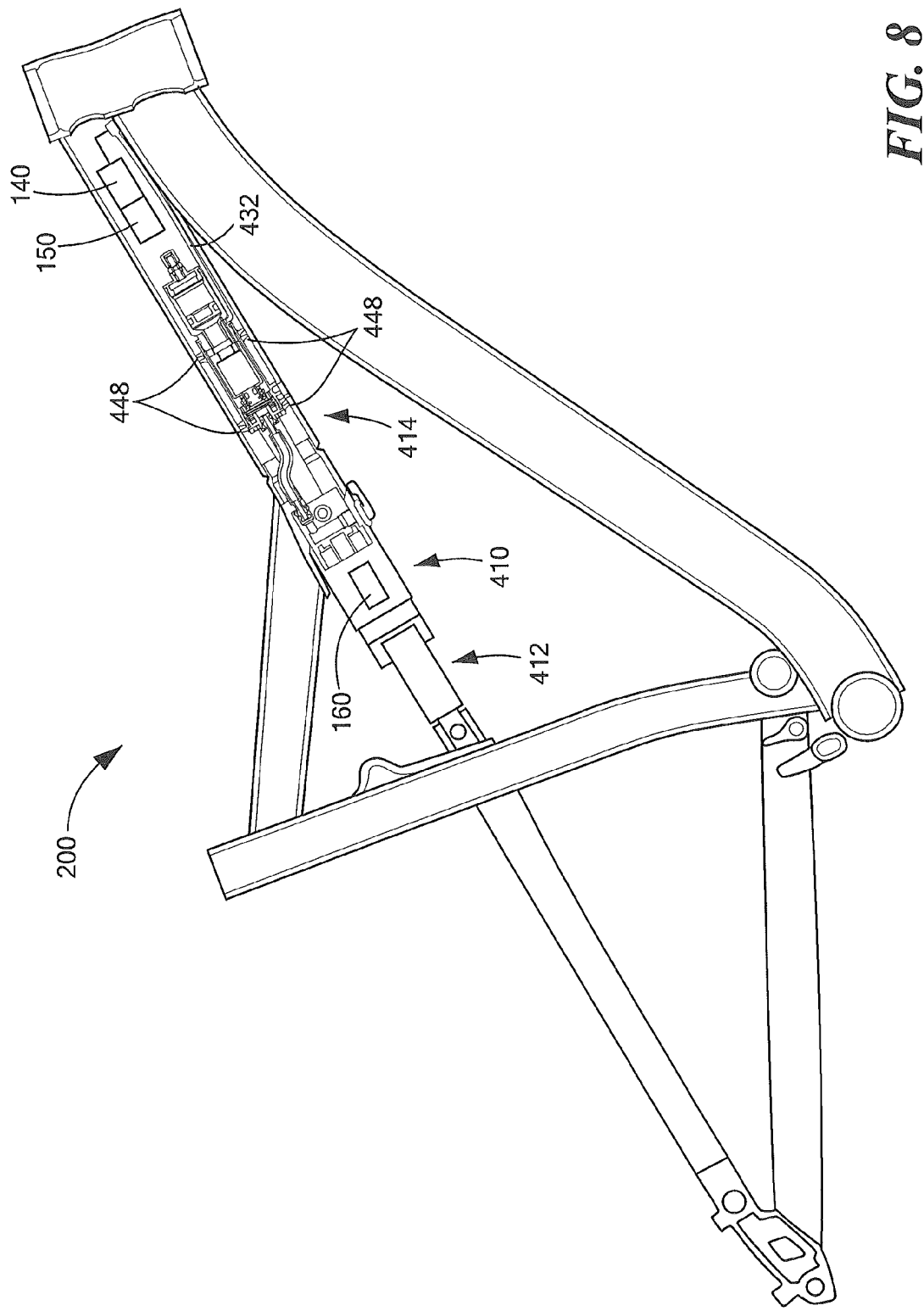
FIG. 8 depicts the bicycle frame of FIG. 3 in accordance with an embodiment of the invention.
Figure 9:
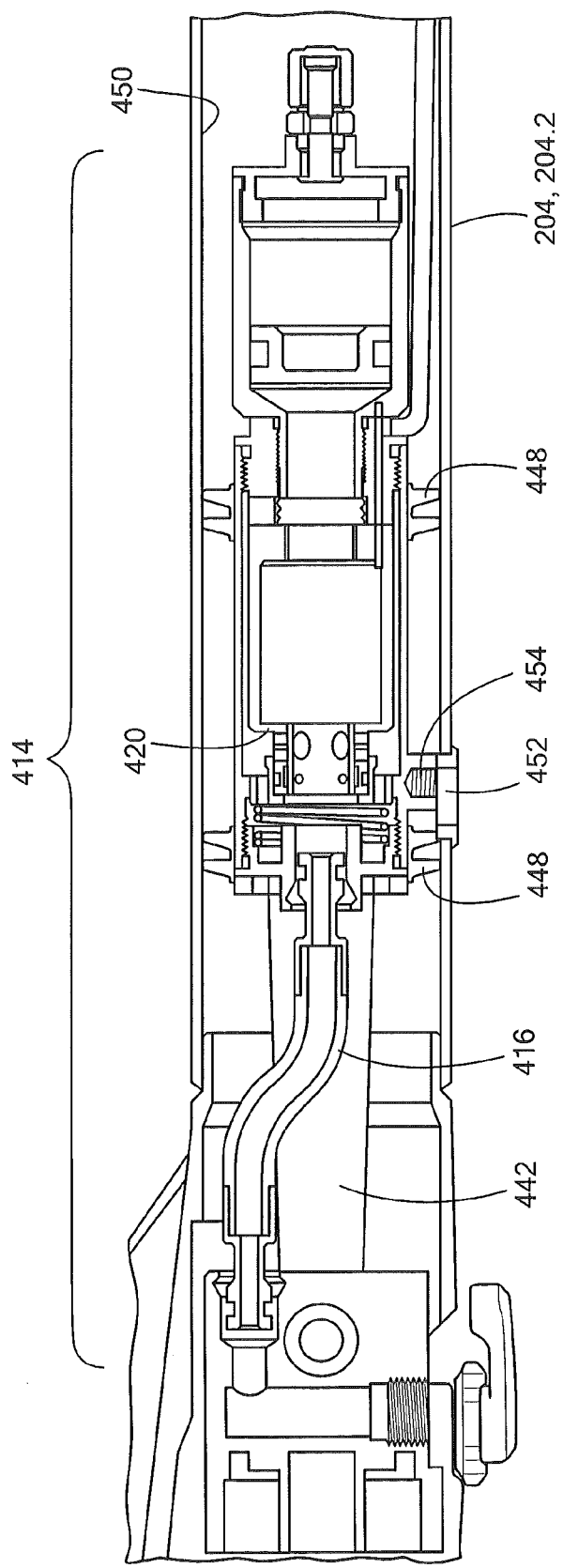
FIG. 9 depicts an enlarged view of the second portion of the split rear shock of FIG. 8 coupled via a strap/bracket in accordance with an embodiment of the invention.

FIGS. 8 and 9 depict the bicycle frame 200, or a portion thereof, similar to that depicted in FIG. 3, where a rubber seal 448, or other suitable sealing material, is disposed around the valve assembly 420 of the second portion 414 of the split rear shock 410 between the valve assembly 420 and an internal surface 450 of the top tube 204 to prevent dirt and/or water from getting inside the bicycle frame 200, particularly in wet weather or when washing the bicycle 100. In an embodiment, the rubber seal 448 also serves to hold the valve assembly 420 in the frame 200. The rubber seal 448 and top tube 204 may also have a small leak path 452 to drain any water that enters the top tube 204 from another location. In an embodiment and disposed within the frame 200, the top tube 204, or the front top tube 204.2, the second inner portion 414 of the shock 410 includes operably connected thereto electronics 140, such as a wireless data connection, a motor control, and/or an accelerometer, for example, and/or a battery 150, rechargeable or not, to power the system (the electronics 140 and the REMA 424 for example) via the electrical wires 432. The accelerometer, referred to generally herein by reference numeral 140, may be disposed on or within the front top tube 204.2, as depicted in FIG. 8 for example, or anywhere else on or within a member of the frame 200 or any other portion of the bicycle 100, such as the front suspension system 300 for example. In an embodiment, the shock absorber 410 also includes a power generation device 160 operably coupled, via wires for example, to recharge the battery 150, either by an electro mechanical, a hydraulic electro mechanical, or a piezo resistive device and associated method, for example. In an embodiment, the power generation device 160 is responsive to relative motion between portions of the shock absorber 410 to create a voltage suitable for recharging the battery 150.

With reference now to FIG. 9, an enlarged view of the second portion 414 of the split rear shock 410 depicted in FIG. 8 is further depicted showing the rubber seal 448 disposed around the valve assembly 420 between the valve assembly 420 and an internal surface 450 of the top tube 204 to prevent dirt from getting inside the bicycle frame 200. Also shown is an optional fastener 454 to provide additional securement of the valve assembly 420 to the bicycle frame 200. Also shown is one side (far side) of a two-sided strap 442, or bracket, securely mounted between the first and second portions 412, 414 of the split rear shock 410. In an embodiment, the strap/bracket 442 takes the force of the flexible hose 416 between the first and second portions 412, 414 and prevents undue stress being imparted to the flexible hose 416, and in conjunction with the rubber seal 448 may be used to secure the second portion 414 to the frame 200 without the need for additional fasteners being required.

Figure 10A:
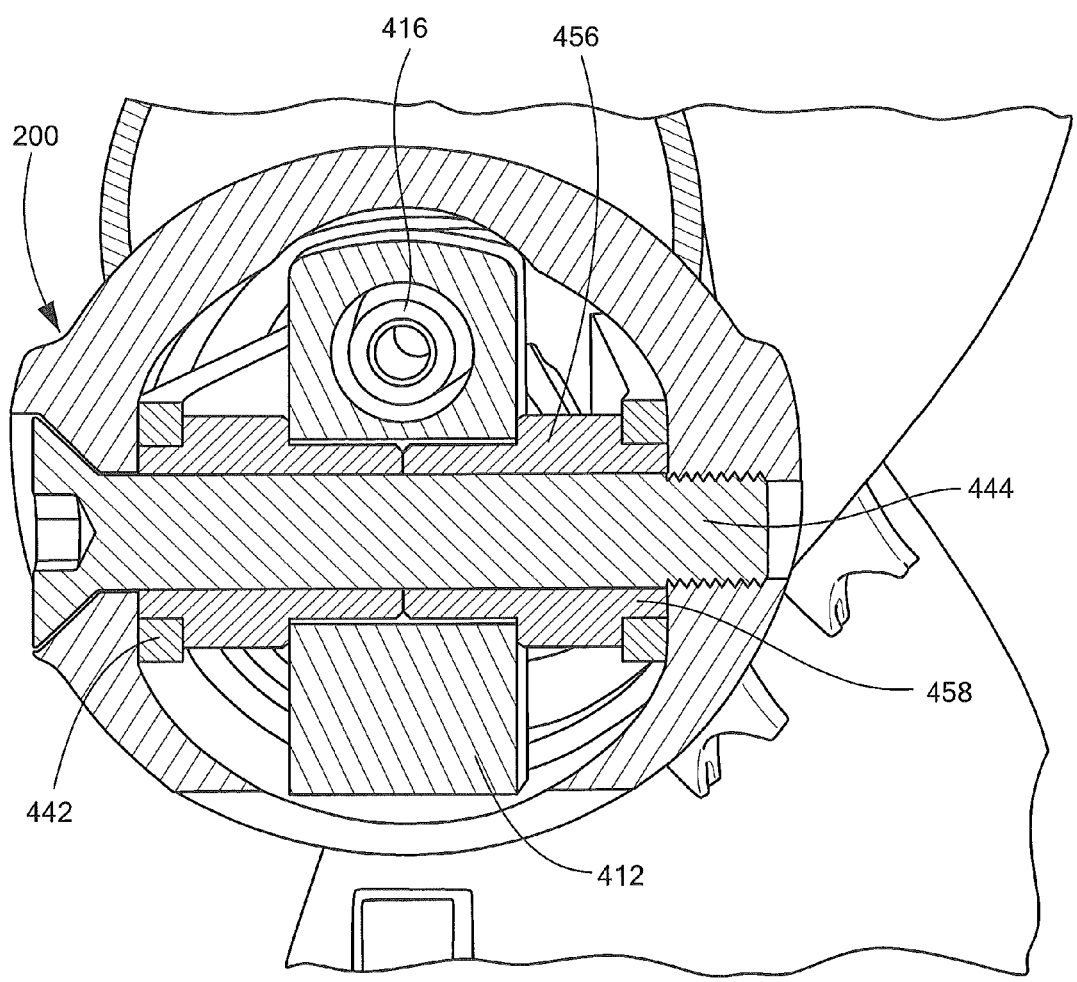
FIGS. 10A and 10B depict a cross section view and a perspective view, respectively, illustrating the strap/bracket of FIG. 9 in accordance with an embodiment of the invention.
Figure 10B:
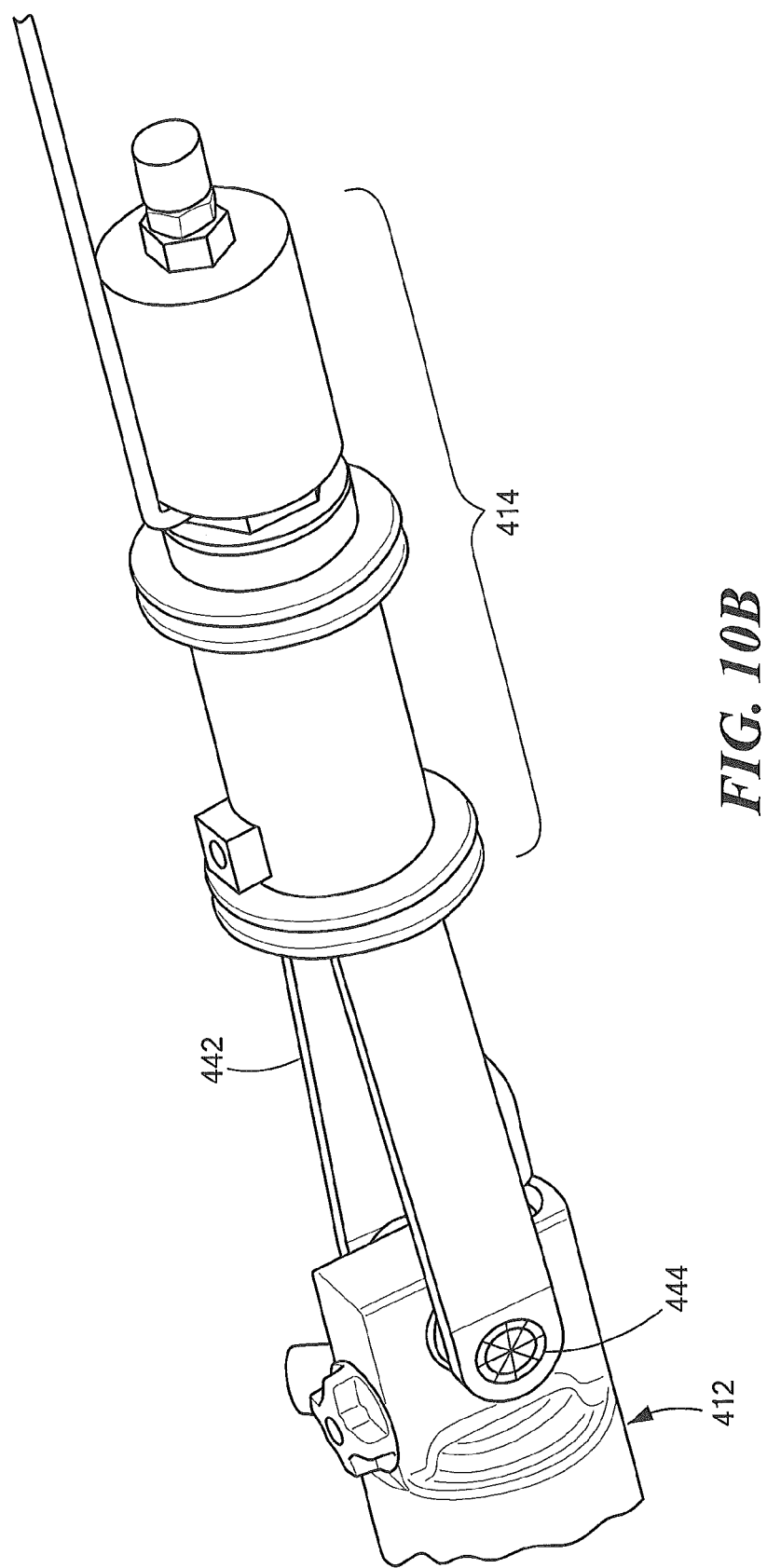

FIGS. 10A and 10B depict a cross section view and a perspective view, respectively, of the strap/bracket 442 of FIG. 9 connecting the second portion 414 with the first portion 412. In an embodiment, a support mount such as a mounting pin 456, or other suitable shock absorber hardware, is disposed between the strap/bracket 442 and the first portion 412 and includes shouldered ends 458 that serve to pinch the strap/bracket 442 between the mounting pin 456 and the bicycle frame 200 at the mounting point, which assists in stabilizing the valve assembly 420. The mounting bolt 444 serves to secure the strap/bracket 442 to the mounting pin 456 and frame 200. By supporting the strap/bracket 442 by the shock hardware, mounting pin 456 for example, it is possible to bend the flexible reservoir hose 416 into its installed position, then clip the strap/bracket 442 into place prior to inserting the second portion 414 (valve/reservoir unit 420, 428) into the frame 200.

Figure 11:
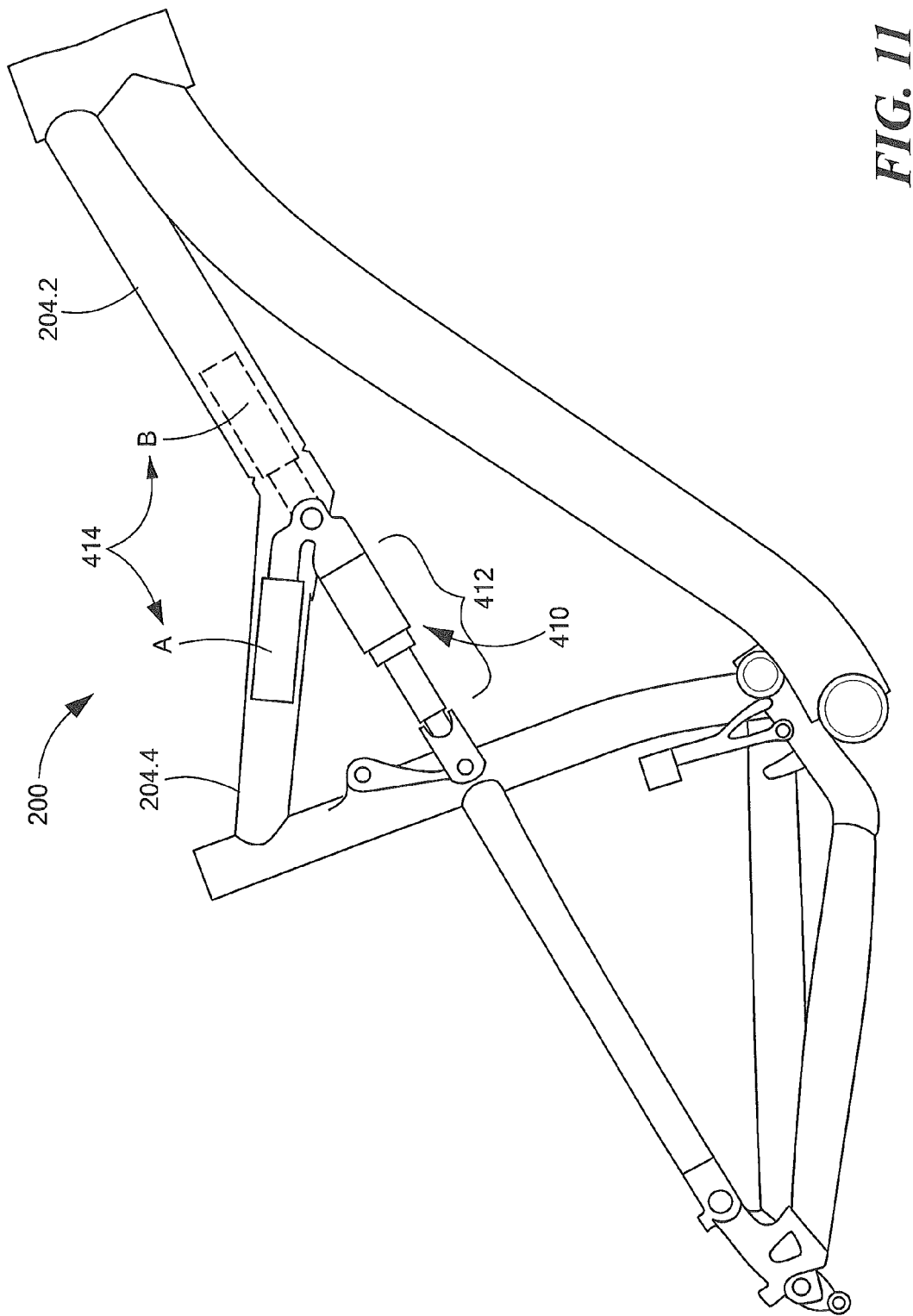
FIG. 11 depicts a frame similar to that of FIGS. 1-3, but where the second inner portion of the shock absorber is depicted in alternative locations within the frame, in accordance with an embodiment of the invention.

Reference is now made to FIG. 11, which depicts a frame 200 similar to that of FIGS. 1-3, but where the second inner portion 414 of the shock absorber 410 is depicted in alternative locations within the frame 200. In a first embodiment, the second inner portion 414 is disposed at location "A" inside the rear top tube 204.4, and in a second embodiment, the second inner portion 414 is disposed at location "B" inside the front top tube 204.2 similar to that of FIG. 3. In either of the foregoing first or second embodiments, the second inner portion 414 comprises a reservoir unit of a piggyback shock, where in the first embodiment the piggyback reservoir unit is disposed at location "A", and in the second embodiment the piggyback reservoir unit is disposed at location "B". In a further embodiment, the piggyback shock (herein referred to generally by reference numeral 410 with reference to FIG. 11) may have two reservoir units, a first reservoir unit disposed at location "A" and a second reservoir unit disposed at location "B". The first outer portion 412 of the embodiment of FIG. 11 comprises the shock body of the piggyback shock that is fluidly coupled to the reservoir unit(s) in a manner known in the art, or via the flexible hose 416.

In view of all of the foregoing, it will be appreciated that the particular and innovative arrangement of components according to the invention disclosed herein not only affords numerous not insignificant technical advantages over known art, but also provides an entirely novel and attractive visual appearance in a compact design.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bicycle, comprising;
a frame comprising a plurality of frame members that includes a first frame member;
a suspension system comprising:
a first portion; and
a second portion fluidly coupled via hydraulic fluid to the first portion;
wherein:
the first portion is disposed external of the first frame member and comprises a shock absorber;
the second portion is disposed internal to the first frame member and comprises a fluid reservoir;
the suspension system further comprising a rotary actuated lock-out valve, and a rotational electro mechanical actuator, the lock-out valve being disposed in operable communication with the electro mechanical actuator.

2. The bicycle of claim 1, wherein:
the second portion further comprises a housing having internal passageways configured to communicate the hydraulic fluid between the shock absorber and the fluid reservoir; and
the electro mechanical actuator and the lock-out valve are disposed within the housing immersed inside the hydraulic fluid therein.

3. The bicycle of claim 1, wherein:
the shock absorber comprises: an air spring; a rebound damping circuit; a compression damping circuit; or, any combination of the air spring, the rebound damping circuit, and the compression damping circuit.

4. The bicycle of claim 1, wherein:
the second portion further comprises a compression damping circuit, a blow-off valve, or a combination of the compression damping circuit and the blow-off valve.

5. The bicycle of claim 1, wherein:
the electro mechanical actuator is a bi-stable electro mechanical actuator.

6. The bicycle of claim 1, wherein:
the second portion is fluidly coupled to the first portion via a flexible hose.

7. The bicycle of claim 1, wherein:
the first frame member is a top tube; and
the suspension system is a rear suspension system.

8. The bicycle of claim 1, further comprising a lefty front tube, wherein:
the plurality of frame members further includes a head tube, the lefty front tube being pivotally connected to the head tube;
the first frame member is the lefty front tube; and
the suspension system is a front suspension system.

9. The bicycle of claim 1, further comprising a pair of front fork tubes, wherein:
the plurality of frame members further includes a head tube, the pair of front fork tubes being pivotally connected to the head tube;
the first frame member is at least one of the pair of front fork tubes; and
the suspension system is a front suspension system.

10. A bicycle, comprising;
a frame comprising a plurality of frame members that includes a first frame member;
a suspension system comprising:
a first portion; and
a second portion fluidly coupled via hydraulic fluid to the first portion;
wherein:
the first portion is disposed external of the first frame member;
the second portion is disposed internal to the first frame member; and
the plurality of frame members includes a head tube, a top tube, a down tube, a seat tube, seat stay tubes, and chain stay tubes, the first frame member being the top tube.

11. The bicycle of claim 1, wherein:
the second portion is coupled to the first portion by at least one structural support disposed and configured to prevent axial movement of the second portion relative to the first portion.

12. The bicycle of claim 10, wherein:
the first portion comprises a support mount; and
the at least one structural support is coupled to the support mount prior to the second portion being disposed internal to the first frame member.

13. The bicycle of claim 1, wherein:
the second portion is fixedly attached to the first frame member.

14. The bicycle of claim 1, wherein:
the first frame member comprises an open end that axially receives the second portion disposed internal to the first frame member.

15. A bicycle, comprising;
a frame comprising a plurality of frame members that includes a first frame member;

a suspension system comprising:
a first portion; and
a second portion fluidly coupled via hydraulic fluid to the first portion;
wherein:
the first portion is disposed external of the first frame member;
the second portion is disposed internal to the first frame member;
the second portion is fixedly attached to the first frame member; and further comprising:
a seal disposed around the second portion between the second portion and an internal surface of the first frame member, which seals an inner region of the first frame member from an external environment and stabilizes the second portion relative to the first portion.

16. A bicycle, comprising;
a frame comprising a plurality of frame members that includes a first frame member;
a suspension system comprising:
a first portion; and
a second portion fluidly coupled via hydraulic fluid to the first portion;
wherein:
the first portion is disposed external of the first frame member and comprises a shock absorber;
the second portion is disposed internal to the first frame member and comprises a lock-out valve, a fluid reservoir, and an electro mechanical actuator, wherein the lock-out valve is disposed in operable communication with the electro mechanical actuator; and
further comprising:
at least one of a battery and an accelerometer, operably connected to the electro mechanical actuator of the second portion, the battery, the accelerometer, or both the battery and the accelerometer being disposed on or within the frame.

17. The bicycle of claim 1, wherein:
the second portion comprises a reservoir unit of a piggy-back shock.

* * * * *